US009921127B2

(12) United States Patent
Clevelario et al.

(10) Patent No.: US 9,921,127 B2
(45) Date of Patent: *Mar. 20, 2018

(54) ASSEMBLY AND SEAL TEST

(71) Applicant: GE Oil & Gas UK Limited, Nailsea, Bristol (GB)

(72) Inventors: Judimar de Assis Clevelario, Rio de Janeiro (BR); Fabio de Souza Pires, Rio de Janeiro (BR); Felipe Areas Vargas, Niteroi (BR); Everton Vieira de Almeida, Rio de Janeiro (BR); Andre Luis de Souza Breves, Rio de Janeiro (BR)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 419 days.

This patent is subject to a terminal disclaimer.

(21) Appl. No.: 14/409,961

(22) PCT Filed: Jun. 24, 2013

(86) PCT No.: PCT/EP2013/063104
§ 371 (c)(1),
(2) Date: Dec. 19, 2014

(87) PCT Pub. No.: WO2014/001237
PCT Pub. Date: Jan. 3, 2014

(65) Prior Publication Data
US 2015/0143878 A1  May 28, 2015

(30) Foreign Application Priority Data

Jun. 26, 2012 (EP) .................................. 12173629

(51) Int. Cl.
*F16L 33/18* (2006.01)
*G01M 3/28* (2006.01)
*F16L 33/01* (2006.01)

(52) U.S. Cl.
CPC ........... *G01M 3/2807* (2013.01); *F16L 33/01* (2013.01); *G01M 3/2853* (2013.01); *F16L 33/18* (2013.01); *F16L 2201/30* (2013.01)

(58) Field of Classification Search
CPC ....... F16L 11/083; F16L 33/003; F16L 33/01; F16L 2201/30; F16L 17/02; F16L 33/16;
(Continued)

(56) References Cited

U.S. PATENT DOCUMENTS 4,259,553 A    3/1981  Tanaka et al.
6,125,693 A *  10/2000  Dubois .................. G01M 3/04
                                                              73/46

(Continued)

FOREIGN PATENT DOCUMENTS

CN  1595089 A     3/2005
CN  1668868 A     9/2005
CN  101553682 A   10/2009

OTHER PUBLICATIONS

International Search Report and Written Opinion of the International Searching Authority, dated Oct. 28, 2013, for corresponding International Application No. PCT/EP2013/063104, 9 pages.

(Continued)

*Primary Examiner* — Randy Gibson
*Assistant Examiner* — Gedeon M Kidanu
(74) *Attorney, Agent, or Firm* — Klarquist Sparkman, LLP

(57) ABSTRACT

An assembly and method of testing the integrity of a sealing ring of a flexible pipe are disclosed. The method includes locating a first sealing ring adjacent a first collar member and a layer of flexible pipe body; energizing the first sealing ring by urging the sealing ring towards a primary pressure-retaining end fitting component, or by urging the pressure-retaining component towards the sealing ring; locating a (Continued)

Figure 1:
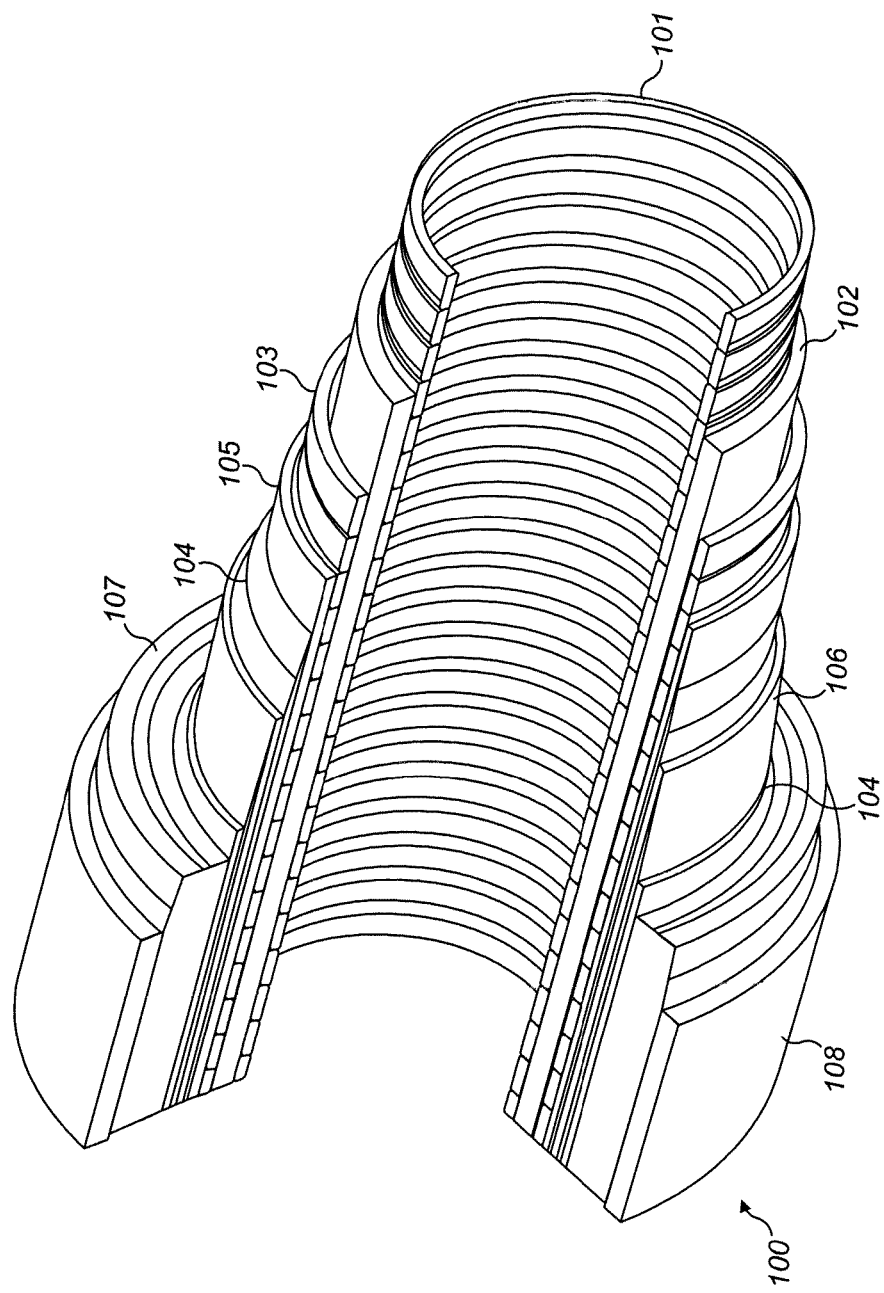

second sealing ring adjacent the first collar member and a second collar member; energizing the second sealing ring by urging the sealing ring towards the pressure-retaining component, or by urging the pressure-retaining component towards the sealing ring; and pressurizing the region between the first sealing ring and the second sealing ring through a port extending towards the region to a predetermined pressure of 5 MPa or greater.

15 Claims, 6 Drawing Sheets

(58) Field of Classification Search
CPC . F16L 33/32; F16L 11/12; F16L 17/08; F16L 2011/047; F16L 2101/30; F16L 23/006; F16L 33/18; F16L 33/28; F16L 35/00; G01M 3/2807; G01M 3/2853; G01M 3/04; G01M 3/283; G01M 3/2846; C09K 2200/0642; C09K 3/10; C09K 3/1009; G01N 19/04
USPC .................. 73/49.5; 138/109; 285/222.1, 255
See application file for complete search history.

(56) References Cited

U.S. PATENT DOCUMENTS

| | | | | |
|---|---|---|---|---|
| 6,592,153 | B1* | 7/2003 | Belcher | F16L 21/04 |
| | | | | 277/607 |
| 6,923,477 | B2* | 8/2005 | Buon | F16L 33/003 |
| | | | | 138/109 |
| 7,946,313 | B2* | 5/2011 | Vo | F16L 11/08 |
| | | | | 138/127 |
| 9,217,526 | B2* | 12/2015 | Eccleston | F16L 11/12 |
| 9,334,993 | B2* | 5/2016 | Cloos | F16L 33/01 |
| 2004/0066035 | A1* | 4/2004 | Buon | F16L 33/003 |
| | | | | 285/222.2 |
| 2009/0322077 | A1* | 12/2009 | Eccleston | F16L 33/01 |
| | | | | 285/337 |
| 2010/0068986 | A1* | 3/2010 | Eccleston | F16L 11/12 |
| | | | | 454/339 |
| 2012/0211975 | A1* | 8/2012 | Campello | E21B 17/085 |
| | | | | 285/222.2 |
| 2014/0013829 | A1* | 1/2014 | Demanze | G01M 3/283 |
| | | | | 73/49.1 |
| 2014/0049039 | A1* | 2/2014 | Karabelas | F16L 33/01 |
| | | | | 285/222.1 |

OTHER PUBLICATIONS

Office Action and Search Report from Patent Office of the People's Republic of China, for Chinese Patent Application No. 201380033989.X, dated Oct. 31, 2016, 17 pages.

International Preliminary Report on Patentability and Written Opinion of the International Searching Authority, dated Jan. 8, 2015, for corresponding International Application No. PCT/EP2013/063104, 7 pages.

* cited by examiner

ASSEMBLY AND SEAL TEST

CROSS REFERENCE TO RELATED APPLICATIONS

This is the U.S. National Stage of International Application No. PCT/EP2013/063104, filed Jun. 24, 2013, which in turn claims priority to and the benefit of European Patent Application No. EP12173629.2, filed Jun. 26, 2012.

The present invention relates to an assembly and to the seal testing of an assembly. In particular, but not exclusively, the present invention relates to fluid sealing systems provided in end fittings of flexible pipes, including the seal configuration and the testing thereof.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body and the connections of pipe body layers with end fittings is increased.

A flexible pipe is an assembly of a portion of a pipe body and one or more end fittings in each of which a respective end of the pipe body is terminated. FIG. 1 illustrates how pipe body 100 may be formed from a combination of layered materials that form a pressure-containing conduit. Although a number of particular layers are illustrated in FIG. 1, pipe body structures may include two or more coaxial layers manufactured from a variety of possible materials. For example, the pipe body may be formed from metallic layers, composite layers, or a combination of different materials. The layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. Pipe body may be used without a carcass layer (i.e. smooth bore) or with a carcass (rough bore). The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed as an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
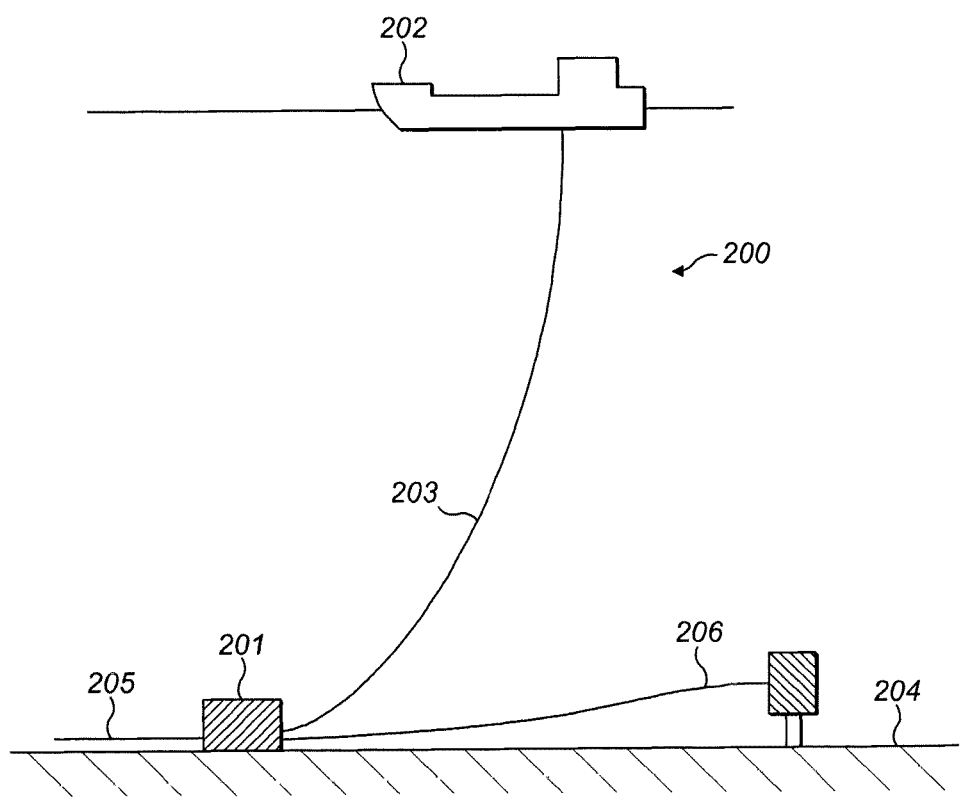

The end fittings of a flexible pipe may be used for connecting segments of flexible pipe body together or for connecting them to terminal equipment such as a rigid sub-sea structures or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting. FIG. 2 illustrates a riser assembly 200 suitable for transporting production fluid such as oil and/or gas and/or water from a sub-sea location 201 to a floating facility 202.

Figure 3:
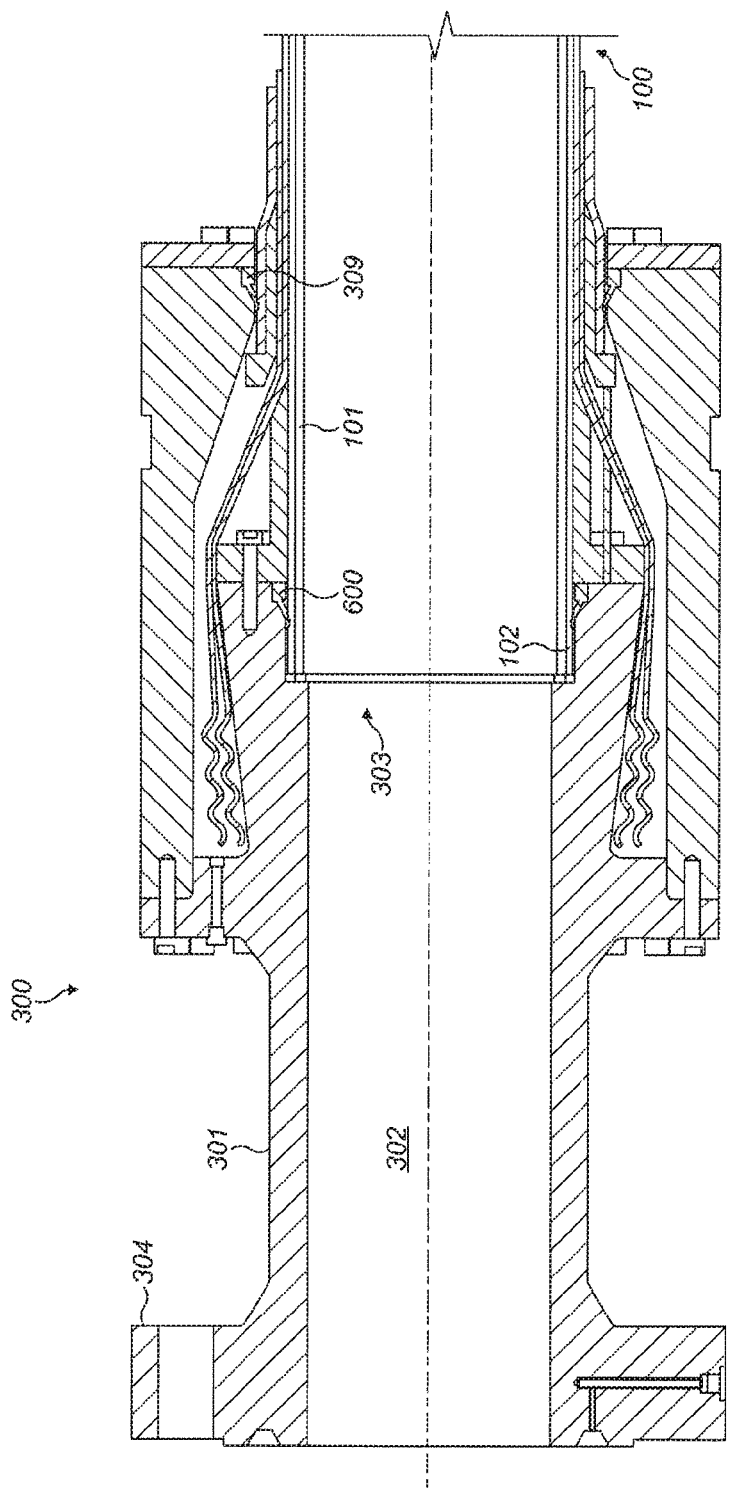

A cross-section of a known end fitting assembly 300, such as disclosed in WO2007/144552 or EP1867907, is shown in FIG. 3. The end fitting 300 includes an end fitting body 301, which includes an internal bore 302 running along its length. The end fitting body is made from steel or other such rigid material. At a first end of the end fitting body 301 there is defined an open mouth region 303 into which an end of a segment of flexible pipe body 100 is located and then terminated. At a further end of the end fitting body 301 is a connector 304. This is formed as a substantially disk-like flared region on the end fitting body. The connector can be connected directly to a matching connector of a further end fitting body of an adjacent segment of flexible pipe body. This can be done using bolts or some other form of securing mechanism. In such a configuration the end fittings would be located in a back-to-back configuration. Alternatively the connector 304 may be connected to a floating or stationary structure such as a ship, platform or other such structure. Various layers of flexible pipe body are introduced to the end fitting assembly, cut to appropriate length, and sealingly engaged with a particular portion of the end fitting.

There are varied problems associated with the provision of end fittings for ends of flexible pipe body. The end fittings must ensure both good fastening and good sealing. In particular, inner seal ring 600 and outer sealing ring 309 may be provided to seal between an adjacent layer of flexible pipe body and the end fitting. A seal is formed by a swaging action, which causes deformation of the sealing ring and/or adjacent layer of pipe body, and compression of the layer of pipe body, which may be of polymer, for example. End fittings vary in design so as to accommodate different variants of flexible pipe body.

Certain end fitting designs may include a further sealing ring such as an intermediate sealing ring, which may be used to form a seal between an intermediate sheath layer of a flexible pipe body and the end fitting. Some known arrangements may have an increased risk of leaking as they cannot easily or reliably be tested during the assembly/fabrication stage of attaching the end fitting to the pipe body, so it cannot be known how effective such seals are.

To date, it has not been possible to test (i.e. verify the integrity of) certain seals of an end fitting body to the approximate pressures equivalent to those pressures experienced in use in a sub-sea environment, such as at deep water or ultra deep water depths. In particular, it has not been possible to test the intermediate seal or outer seal to the pressures that they may see from the external hydrostatic pressure of water. The known technologies can only pressurise the void spaces between sequential sealed layers in the pipe body structure; the outermost void space may only be pressurised to a pressure of less than about 1 MPa without rupture of the unsupported outer sheath layer in the pipe body. Without the use of a large external pressure force to support this outer layer or to significantly test the ability of the seals to withstand external pressure (e.g. testing the whole pipe within a pressurised chamber such as a hyperbaric chamber, of which none may be large enough to accept a complete spool of pipe), such testing/seal integrity verification has not been possible.

According to a first aspect of the present invention there is provided a method of testing the integrity of a sealing ring of a flexible pipe, comprising:

locating a first sealing ring adjacent a first collar member and a layer of flexible pipe body;

energising the first sealing ring by urging the sealing ring towards a primary pressure-retaining end fitting component, or by urging the pressure-retaining component towards the sealing ring;

locating a second sealing ring adjacent the first collar member and a second collar member;

energising the second sealing ring by urging the sealing ring towards the pressure-retaining component, or by urging the pressure-retaining component towards the sealing ring; and pressurising the region between the first sealing ring and the second sealing ring through a port extending towards the region to a predetermined pressure of 5 MPa or greater.

As used herein, the term primary pressure-retaining end fitting component is used to mean any part of an end fitting that is used to retain pressure, or any element, such as an end cap, used to simulate a part of an end fitting. In practice this may be the end fitting body, jacket or an inner collar for example.

According to a second aspect of the present invention there is provided an assembly for proof testing the integrity of a sealing arrangement of a flexible pipe, comprising:

a primary pressure-retaining end fitting component provided to cover an open mouth of a flexible pipe body;

a first sealing ring to be provided between the pressure-retaining component, a first collar member and a layer of the flexible pipe body;

a second sealing ring to be provided between the first collar member, a second collar member and the layer of flexible pipe body;

and further comprising a port extending towards the first sealing ring for pressurising the region between the first sealing ring and the second sealing ring.

According to a third aspect of the present invention there is provided a kit of parts.

According to a fourth aspect of the present invention there is provided an assembly substantially as herein described with reference to the drawings.

According to a fifth aspect of the present invention there is provided a method substantially as herein described with reference to the drawings.

Certain embodiments of the invention provide the advantage that a sealing system is provided that has improved reliability compared to known arrangements.

Certain embodiments of the invention provide a method of testing the seal integrity of a flexible pipe prior to deployment. As such, the lifetime of the flexible pipe may be more accurately forecast.

Figure 4:
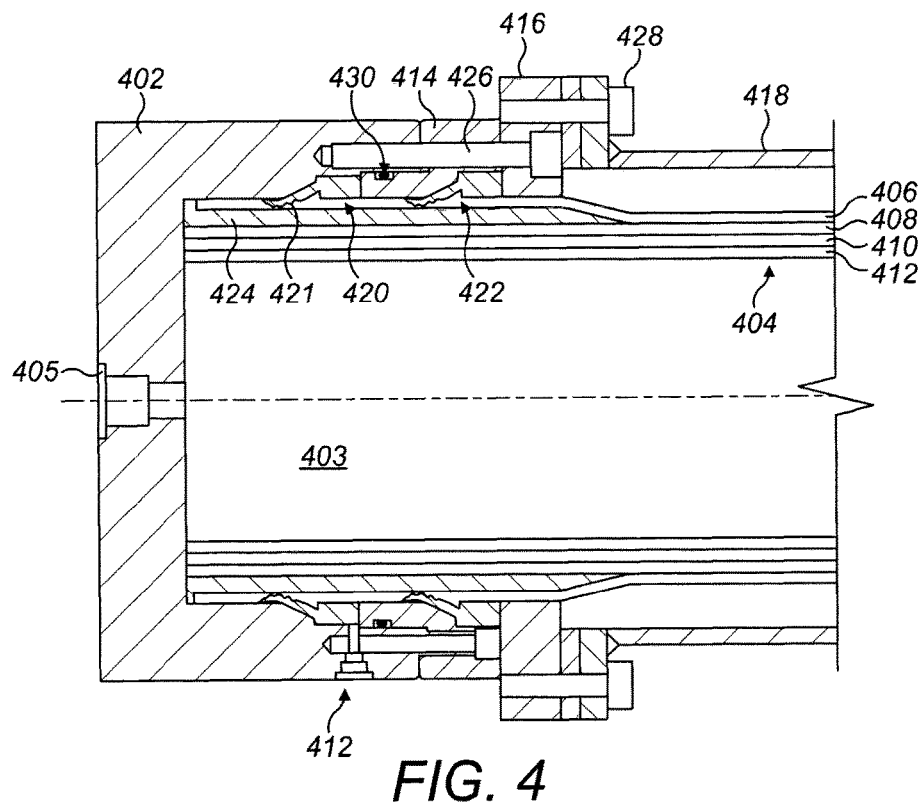
Figure 5:
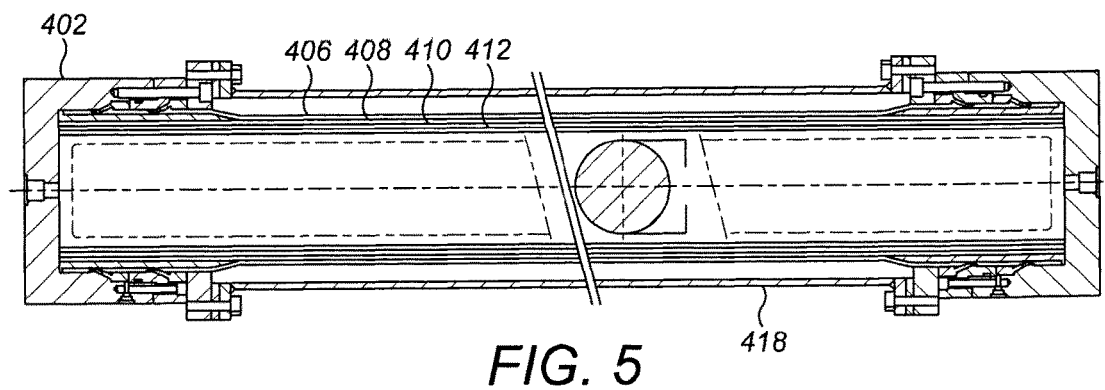
Figure 6:
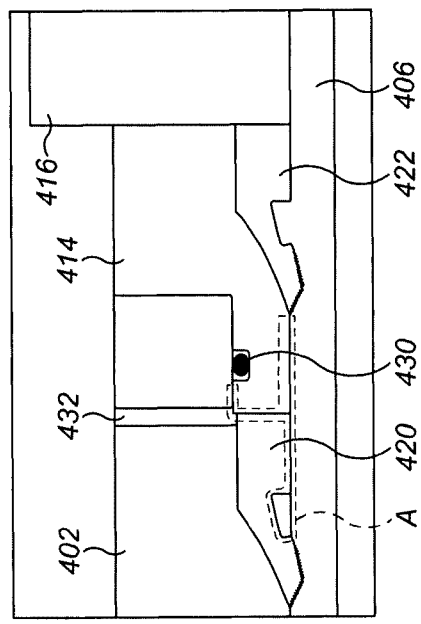
Figure 7:
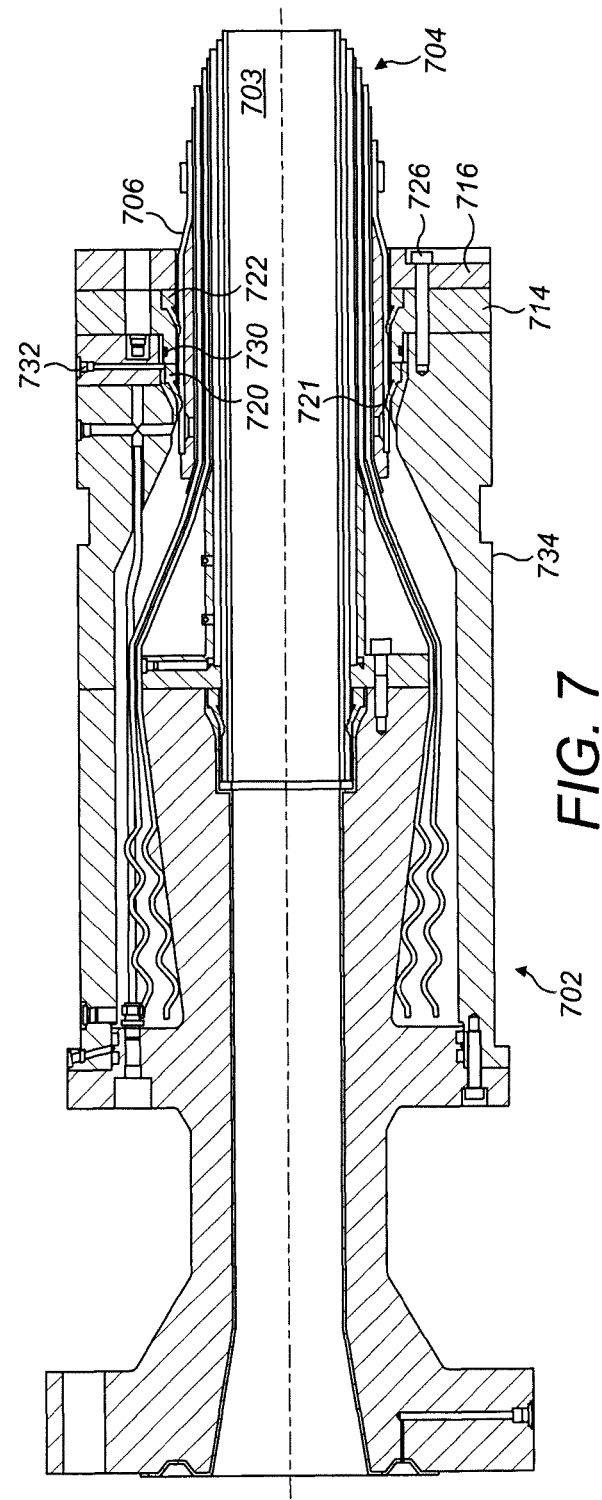
Figure 8:
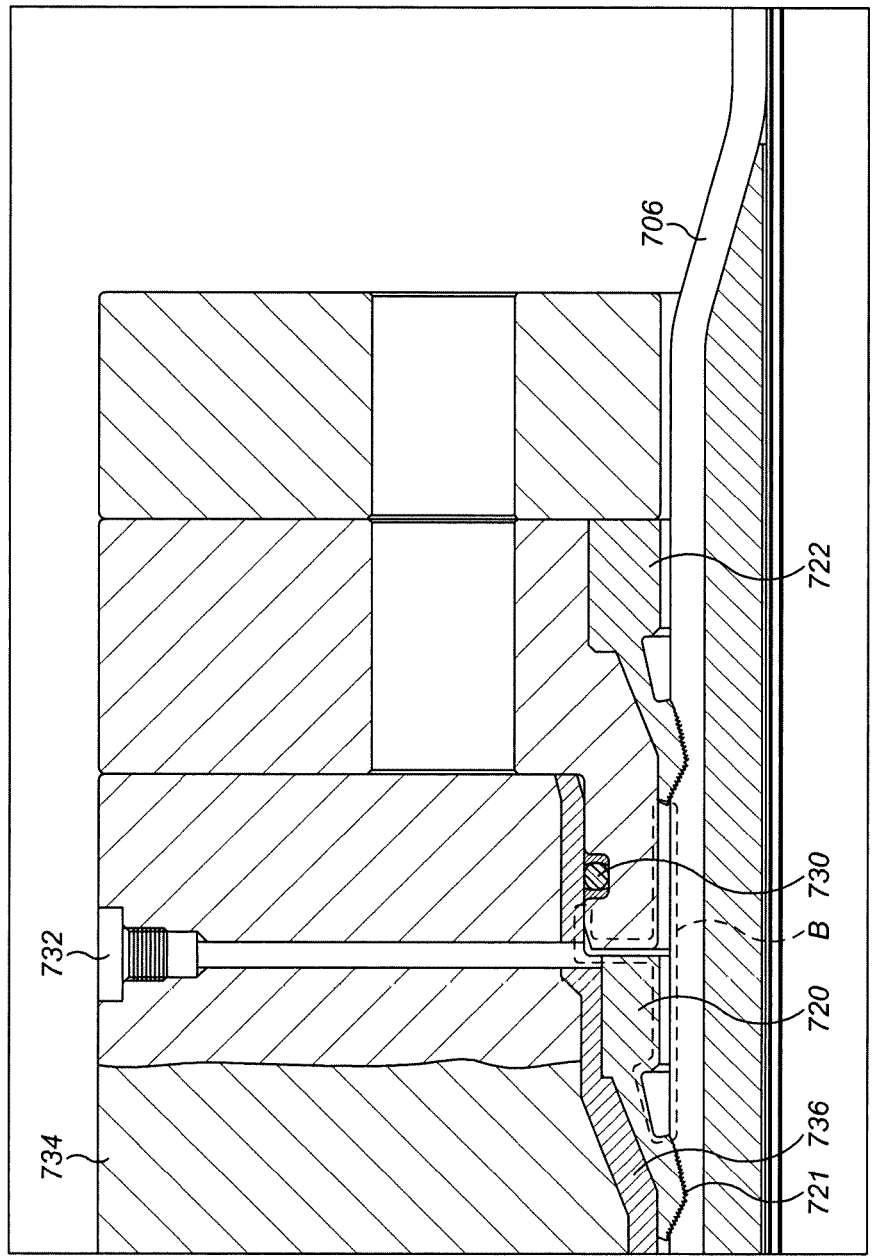

Embodiments of the invention are further described hereinafter with reference to the accompanying drawings, in which:

FIG. 1 illustrates a flexible pipe body;
FIG. 2 illustrates a riser assembly;
FIG. 3 illustrates an end fitting;
FIG. 4 illustrates a portion of a seal testing rig;
FIG. 5 illustrates the seal testing rig of FIG. 4;
FIG. 6 illustrates an enlarged view of a portion of FIG. 4;
FIG. 7 illustrates a pipe body connected to an end fitting; and
FIG. 8 illustrates an enlarged view of part of FIG. 7.

In the drawings like reference numerals refer to like parts.

FIG. 4 illustrates a cross-section of a portion of a seal testing rig including arrangements in accordance with an embodiment of the present invention, which has been used to test the sealing system configuration. FIG. 5 shows a seal testing rig in full. The arrangement of FIGS. 4 and 5 may be used to test the parameters of a sealing ring such as shape, size, material used, etc., as well as to confirm the arrangement and design of the sealing ring with respect to its surrounding components, and the testing methodology itself for application to further tests (as described in more detail below regarding FIGS. 7 and 8 for example).

The apparatus includes an end cap 402 that is connected to various layers of a flexible pipe body 404. The end cap 402 acts as a primary pressure-retaining end fitting component.

Although not shown in FIG. 4, the remaining end of the pipe body may also be capped (as per FIG. 5 for example), so as to form an enclosed chamber. With both ends of the pipe body capped, a fluid may be introduced into the bore 403 of the pipe body via a port 405 to simulate the bore pressures experienced during pipe use. However, the testing apparatus is mainly concerned with the seal integrity when experiencing a pressure from outside of the pipe body (such as hydrostatic pressure experienced under the sea). Therefore the pipe bore 403 need not be pressurised. The port 405 could be closed off, or connected to a pressure gauge to review the pressure in the void space of the bore (a reduction in pressure may indicate a collapse of the pipe body).

The pipe body layers shown in FIG. 4 include an intermediate sheath 406, which may be of PE, PEX, TPE, PA-11, PA-12, or PVDF polymers, two layers of metallic tensile armour wire 408,410, and an internal polymer liner 412. Of course, the pipe body layers may differ in other embodiments of the invention. The sheath 406 may alternatively be an outer sheath.

The testing rig further includes a first collar member 414, a second collar member 416 and a support tube 418. The first and second collar members are metallic, annular, and have a cross-section to fit against the pipe body 404 and adjacent end cap 402. The support tube provides rigidity to the section of pipe body undergoing testing by supporting testing apparatus at one end of the pipe body in relation to the apparatus at the other end of the pipe body.

Provided adjacent the first collar member 414 and the intermediate sheath 406 is a first sealing ring 420, which is of metal, here type 316 stainless steel. That is, the sealing ring 420 is located between the end cap 402, the first collar member 414 and the intermediate sheath 406.

Provided adjacent the first collar member 414 and the second collar member 416 is a second sealing ring 422, also of metal, again type 316 stainless steel. That is, the sealing ring 422 is located between the first and second collar members and the intermediate sheath 406. The sealing rings themselves are of a known design, such as described in EP1867907 for example.

The apparatus further includes a sleeve 424, to support the intermediate sheath 406, and bolts 426,428. There may be two or more bolts 426 around the circumference of the apparatus, though two are shown in FIG. 4. The bolts 426 are used to affix the collar members to the end cap. There may be two or more bolts 428 around the circumference of the apparatus, though two are shown in FIG. 4. The bolts 428 are used to affix the support tube 418 to the second collar member 416.

An O-ring 430 is positioned in a void provided in the first collar member 414, with the function of preventing a leak path along the joining faces of the end cap 402 and first collar member 414.

As described above, to provide a good seal, a sealing ring should be energised by a swaging action to form a strong seal. This involves the two adjacent elements, in the case of the sealing ring 420, the end cap 402 and first collar member 414, being brought together (in either direction or simultaneously) until further movement is prevented. Then, the adjacent elements are brought closer together, which is likely to deform the wedge-like portion of the sealing ring 421 and urge the wedge-like portion into a close sealing configuration with the pipe layer below (intermediate sheath 406). The pipe layer may also deform somewhat.

Contrary to other known configurations, two sealing rings are provided in this area of pipe, with the second sealing ring 422 provided coaxially and on the opposite side to the wedge-like portion 421. The second sealing ring 422 should also be energised by swaging. In this example, this may be achieved by urging the bolt 426 towards the end cap 402. This forces the first collar member 414 towards the end cap to energise the first sealing ring 420, and the second collar member 416 towards the first collar member to energise the second sealing ring 422.

The first and second sealing rings are orientated in the same direction, which assists with their installation and energisation. That is, each sealing ring faces the same direction (with the wedge-like portion facing to the left in the cross-section of FIG. 4). This allows the two seals to be treated similarly when performing a swaging action on the seals to energise the seals. For example, a single axial motion in one direction may be used to energise both seals. In addition, the same orientation of both seals allows a simple installation technique to be used and provides a more reliable seal as stresses in the polymer barrier layer between the sealing rings during energisation are not acting against the sealing forces.

A test port 432 is provided in the end cap 402, which is a passageway extending from the outer edge of the end cap and radially inwards towards the region between the first sealing ring and second sealing ring.

FIG. 6 shows an enlarged view of the area of the two sealing rings 420,422. In use, i.e. in a testing mode, a fluid (e.g. water or air) may be introduced into the port 432 to pressurise the region between the two sealing rings. The pressure introduced may aptly be 5 MPa, or more. The pressure may be predetermined to simulate the hydrostatic pressure experienced under the sea in use. As such, the fluid may be introduced via the port 432 and the fluid pressurised to a level that has been predetermined in accordance with the requirements of use of the pipe in service. Of course the pressure applied should be limited to a level that is less than the pressure that would be destructive to the pipe. Certain arrangements may warrant testing to 5 MPa, or 10 MPa, or 20 MPa, or 30 MPa, or 40 MPa, or 50 MPa, for example.

With this arrangement, the joints between elements as indicated by the dotted line A will receive pressurised fluid. The pressure of the fluid under pressure is monitored over a test period. Upon reaching a pressurized state, this region should not see a fall in pressure over the test period, due to the first and second sealing rings 420,422 and the O-ring 430. The region may be pressurised for a predetermined period, for example 5 minutes, or up to 2 hours or more. The period of testing will become less useful if pressure is held for many hours, as fluid may begin to permeate the polymer sheath 406.

If the apparatus gives no indication of a leakage or failure, as signified by a drop in pressure, then the integrity of the seal 420 may be confirmed.

Various modifications to the detailed designs as described above are possible. For example, the sealing arrangement need not be designed to test an intermediate seal. A similar arrangement may be used to test a seal adjacent an outer collar member against an end fitting jacket, for example as in FIGS. 7 and 8. Various layers and combinations of layers may be used, depending upon the required conditions of the flexible pipe. Whilst the bolts described above act to both fasten the collars together and also to swage the sealing rings, other devices may be used to swage the sealing rings, such as application of an external force, for example by use of a swaging tool to apply force to a portion of the pressure-retaining component. The swaging tool may be removed after use. Other devices may be used to affix the collars such as adhesive or weldments, etc.

Although the sealing rings have been described above as formed from type 316 stainless steel, other materials may be used. For example, other stainless steels, other metals, type 625 nickel alloy, other nickel alloys, or other materials, or a combination of materials, may be used.

FIG. 7 illustrates another embodiment of the invention in which a seal testing arrangement is incorporated. FIG. 7 shown a flexible pipe body 704 connected to an end fitting 702. In this example the pipe body has several more layers than the previous embodiment (such as those described with respect to FIG. 1), each terminated at the end fitting in a known manner. With this arrangement, the pipe bore 703 is not pressurised.

A first sealing ring 720 and second sealing ring 722 are provided in the end fitting in a similar arrangement to as described above in the first embodiment.

The apparatus further includes a first collar member 714 and a second collar member 716. The first and second collar members are metallic, annular, and have a cross-section to fit against the pipe body 404 and jacket 734 of the end fitting 702.

The apparatus further includes a bolt 726. There may be two or more bolts 726 around the circumference of the apparatus, though only one is shown in FIG. 7. The bolt 726 is used to affix the collar members to the end fitting jacket.

An O-ring 730 is positioned in a void provided in the first collar member 714, with the function of preventing a leak path along the joining faces of the jacket 734 and first collar member 714.

During construction of the flexible pipe, the sealing ring 720 is energised by bringing together (in either direction or simultaneously) the jacket 734 and first collar member 714 until further movement is prevented. Then, the adjacent elements are brought closer together, which is likely to deform the wedge-like portion of the sealing ring 721 and urge the wedge-like portion into a close sealing configuration with the pipe layer below (outer sheath 706). The pipe layer may also deform somewhat.

The second sealing ring 722 is provided coaxially and on the opposite side to the wedge-like portion 721. The second sealing ring 722 should also be energised by swaging. In this example, this is achieved by urging the bolt 726 towards the end fitting jacket 734. This forces the first collar member 714 towards the jacket to energise the first sealing ring 720, and the second collar member 716 towards the first collar member to energise the second sealing ring 722.

A test port 732 is provided in the end fitting jacket 734, which is a passageway extending from the outer edge of the jacket and radially inwards towards the region between the first sealing ring and second sealing ring.

FIG. 8 shows an enlarged view of the area of the two sealing rings 720,722. In use, i.e. in a testing mode, a fluid may be introduced into the port 732 to pressurise the region between the two sealing rings. The pressure introduced my aptly be 5 MPa, or more. The pressure may be predetermined to simulate the hydrostatic pressure experienced under the sea in use. Of course the pressure applied should be limited to a level that is less than the pressure that would be destructive to the pipe.

The embodiment shown in FIG. 8 additionally includes an optional Inconel cladding 736, which is added to help prevent or mitigate corrosion and thus help maintain the seal.

With the above-described arrangement, the joints between elements as indicated by the dotted line B will receive pressurised fluid. Upon reaching a pressurized state, this region should not see a fall in pressure over the test period, due to the first and second sealing rings 720,722 and the O-ring 730. The region may be pressurised for a predetermined period, for example 5 minutes, or up to 2 hours or more. If the apparatus gives no indication of a leakage or failure, as signified by a drop in pressure, then the integrity of the seal 720 may be confirmed.

Upon testing of the sealing ring 720, with a positive result (i.e. the seal maintains its integrity under the applied pressure), the pressure may be removed, the port 732 closed, and the flexible pipe construction may be completed ready for use. The sealing ring 722 may become effectively redundant (its only use being as part of the testing arrangement), or may be used as a precautionary second seal.

With the above-described arrangement, it is possible to test the reliability of a sealing ring to be used in a flexible pipe to be used at great depths under the sea, such as 1000 m or more.

By forming a chamber between a first and second sealing ring, high pressure can be applied to test the integrity of the first sealing ring, yet without subjecting the remainder of the pipe to that high pressure. As such, the high pressure is applied only at the point of the pipe to be tested.

It is particularly useful to be able to have a high degree of confidence in the performance of a sealing ring, because it is impossible to replace a faulty sealing ring after deployment into the sea without completely re-terminating the pipe, which involves removing the pipe from its in-use location, removing the end fitting including the faulty sealing ring, and re-fitting a new end fitting arrangement, before reuse of the pipe.

With the above described invention, the sealing ring parameters may be tested to find the most suitable structure, and the arrangement of elements tested to find the most suitable arrangement.

With the above-described invention, a sealing ring may be tested during construction of a flexible pipe to ensure its sealing integrity prior to deployment of the flexible pipe.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of testing the integrity of a sealing ring of a flexible pipe, comprising:
   locating a first sealing ring adjacent a first collar member and in contact with a layer of flexible pipe body;
   energising the first sealing ring by urging the sealing ring towards a primary pressure-retaining end fitting component, or by urging the pressure-retaining component towards the sealing ring;
   locating a second sealing ring adjacent the first collar member and a second collar member and in contact with the same layer of flexible pipe as the first sealing ring;
   energising the second sealing ring by urging the sealing ring towards the pressure-retaining component, or by urging the pressure-retaining component towards the sealing ring; and
   pressurising a region between the first sealing ring and the second sealing ring through a port extending towards the region to a predetermined pressure of 5 MPa or greater, and
   wherein the first and second sealing rings have a cross-section comprising a wedge-like portion, and wherein the first and second sealing rings are oriented in the same axial direction such that the wedge-like portion faces a connector of an end fitting or an end cap to which the flexible pipe body is connected.

2. A method as claimed in claim 1 wherein the step of locating the first sealing ring further comprises locating the first sealing ring directly adjacent the pressure-retaining component.

3. A method as claimed in claim 1 further comprising providing an O-ring between the first collar member and the pressure-retaining component to thereby block a possible leak path between the first collar member and the pressure-retaining component.

4. A method as claimed in claim 1 further comprising using the first collar member to urge the first sealing ring towards the pressure-retaining component.

5. A method as claimed in claim 1 wherein the step of energising the second sealing ring comprises urging the pressure-retaining component and the first collar member towards the second collar member.

6. A method as claimed in claim 1 wherein the step of energising the second sealing ring comprises urging the second collar member towards the pressure-retaining component and the first collar member.

7. A method as claimed in claim 1 wherein the collar member is an intermediate collar member or an outer collar member.

8. A method as claimed in claim 1 wherein the predetermined pressure is about 5 to 50 MPa.

9. A method as claimed in claim 1 further comprising compressing the first sealing ring and second sealing ring against the same layer of flexible pipe body to partially deform the layer of flexible pipe body.

10. A method as claimed in claim 1 wherein the pressure-retaining component is an end cap or end fitting.

11. A kit of parts comprising the elements described in claim 1.

12. An assembly for proof testing the integrity of a sealing arrangement of a flexible pipe, comprising:
    a primary pressure-retaining end fitting component provided to cover an open mouth of a flexible pipe body;
    a first sealing ring to be provided between the pressure-retaining component, a first collar member and a layer of the flexible pipe body;
    a second sealing ring to be provided between the first collar member, a second collar member and the layer of flexible pipe body, wherein the first and second sealing rings are configured to be placed around and in contact with the same layer of flexible pipe body;
    and further comprising a port extending towards the first sealing ring for pressurising a region between the first sealing ring and the second sealing ring,
    wherein the first and second sealing rings have a cross-section comprising a wedge-like portion, and wherein the first and second sealing rings are oriented in the same axial direction such that the wedge-like portion faces a connector of an end fitting or an end cap to which the flexible pipe body is connected.

13. An assembly as claimed in claim 12 wherein the port is arranged to enable pressurising of the region to a predetermined pressure of 5 MPa or greater.

14. An assembly as claimed in claim 12 wherein the port is provided in the pressure-retaining component.

15. An assembly as claimed in claim 14 wherein the pressure-retaining component is an end fitting or end cap.

* * * * *